UNITED STATES PATENT OFFICE.

BARTON H. JENKS, OF BRIDESBURG, PENNSYLVANIA.

IMPROVED PROCESS FOR COLORING WOOD, &c.

Specification forming part of Letters Patent No. 55,110, dated May 29, 1866.

*To all whom it may concern:*

Be it known that I, BARTON H. JENKS, of Bridesburg, Philadelphia county, State of Pennsylvania, have invented a new and useful Process for Coloring Woods and other Porous Substances; and I do hereby declare that the following is a full, clear, and exact description thereof.

This invention relates to a new and useful process for ornamenting various kinds of cheap woods and imitating the more valuable varieties of wood for the purpose of producing a new article of commerce which will be valuable in the manufacture of furniture, and other purposes where ornamental woods are required.

The invention consists in imparting permanent colors to different kinds of wood by first expelling the air from the spiracles or pores of the wood, and then injecting into these void spaces any suitable coloring-matter, which will thus permeate every pore and strike through the body of the wood, by which means lumber in the rough can be colored to imitate many of the most beautiful and valuable varieties of wood, and afterward wrought in the various forms required.

To enable others skilled in the art to understand my invention, I will describe one mode of carrying it into effect.

I take a very strong vessel of any required capacity having an opening leading into it, through which the wood which is to be treated is put into the vessel. This opening should be closed air-tight after the wood has been put into the vessel. I then exhaust the air from the vessel by means of a powerful air-pump, or in any other suitable manner, and continue to exhaust until the air has been expelled from the spiracles or pores of the wood. I now introduce into the vessel a solution of coloring-matter, which will permeate the substance of the wood and fill the spaces made vacant by the exhausting process. The wood is then removed from the vessel and properly dried, when it is ready for the market.

I do not confine the invention to any particular kind of coloring-matter, but desire to avail myself of the use of all the well-known dyes and aniline colors which may be found best adapted to the purpose and which will give the greatest permanency of color.

If desirable, various colors may be used at the same time and upon the same piece of wood, so as to stain the piece in a variegated manner throughout its substance.

By thus treating wood in a vacuum the coloring-matter will saturate it thoroughly and uniformly, and the lumber may be carved or turned into various forms, and otherwise cut into, without destroying the color.

The vacuum treatment will deprive wood which has not been thoroughly seasoned of its fluid gummy juices and allow the coloring-solution to fill their places, and by this process the common white pine and other colored woods may be beautifully colored, and made to serve many useful purposes, as a substitute for the more expensive and scarce varieties of wood.

My invention is also applicable to the dyeing of other vegetable substances, and also to the dyeing of animal substances, such as cloths, leather, &c.

Having thus described my invention, what I claim as new, and desire to secure by Letters Patent, is—

1. The process, substantially as described, of injecting wood and other porous substances with coloring-matter.

2. The new manufacture of wood prepared substantially as described.

Witness my hand in the matter of my application for a patent for a process for coloring wood and other porous substances.

BARTON H. JENKS.

Witnesses:
R. T. CAMPBELL,
HENRY SYLVESTER.